US008753603B2

(12) United States Patent
Viswanathan

(10) Patent No.: US 8,753,603 B2
(45) Date of Patent: *Jun. 17, 2014

(54) MICROWAVE-ASSISTED SYNTHESIS OF CARBON NANOTUBES FROM TANNIN, LIGNIN, AND DERIVATIVES

(75) Inventor: Tito Viswanathan, Little Rock, AR (US)

(73) Assignee: Board of Trustees of the University of Arkansas, Little Rock, AR (US)

( * ) Notice: Subject to any disclaimer, the term of this patent is extended or adjusted under 35 U.S.C. 154(b) by 426 days.

This patent is subject to a terminal disclaimer.

(21) Appl. No.: 13/069,132

(22) Filed: Mar. 22, 2011

(65) Prior Publication Data
US 2011/0171110 A1 Jul. 14, 2011

Related U.S. Application Data

(63) Continuation-in-part of application No. 12/487,323, filed on Jun. 18, 2009.

(60) Provisional application No. 61/316,654, filed on Mar. 23, 2010, provisional application No. 61/316,682, filed on Mar. 23, 2013, provisional application No. 61/132,380, filed on Jun. 18, 2008.

(51) Int. Cl.
D01F 9/12 (2006.01)
A62D 3/00 (2006.01)
C07C 1/00 (2006.01)
B82Y 40/00 (2011.01)
B82Y 30/00 (2011.01)
B82Y 99/00 (2011.01)

(52) U.S. Cl.
CPC .......... B82Y 40/00 (2013.01); B82Y 99/00 (2013.01); B82Y 30/00 (2013.01); Y10S 977/742 (2013.01); Y10S 977/842 (2013.01)

USPC .............. 423/447.2; 423/447.1; 204/157.43; 204/157.15; 977/742; 977/842

(58) Field of Classification Search
None
See application file for complete search history.

(56) References Cited

U.S. PATENT DOCUMENTS 3,148,161 A   9/1964   Wentorf, Jr. et al.
3,803,033 A   4/1974   Sutherland
(Continued)

FOREIGN PATENT DOCUMENTS

CN   1876566 A   12/2006
CN   1911792 A   2/2007
(Continued)

OTHER PUBLICATIONS

Antal et al., Flash carbonization of biomass, Industrial & Engineering Chemistry Research, 2003, 42(16), 3690-3699.
(Continued)

Primary Examiner — Guinever Gregorio
(74) Attorney, Agent, or Firm — Morris, Manning & Martin, LLP; Tim Tingkang Xia, Esq.

(57) ABSTRACT

A method of synthesizing carbon nanotubes. In one embodiment, the method includes the steps of: (a) dissolving a first amount of a first transition-metal salt and a second amount of a second transition-metal salt in water to form a solution; (b) adding a third amount of tannin to the solution to form a mixture; (c) heating the mixture to a first temperature for a first duration of time to form a sample; and (d) subjecting the sample to a microwave radiation for a second duration of time effective to produce a plurality of carbon nanotubes.

19 Claims, 9 Drawing Sheets

(56) References Cited

U.S. PATENT DOCUMENTS

| | | | |
|---|---|---|---|
| 3,886,093 | A | 5/1975 | Dimitri |
| 4,019,995 | A | 4/1977 | Briggs |
| 4,108,767 | A | 8/1978 | Cooper |
| 4,457,853 | A | 7/1984 | Detroit |
| 4,985,225 | A | 1/1991 | Hashimoto et al. |
| 5,604,037 | A | 2/1997 | Ting |
| 5,609,683 | A | 3/1997 | Pike-Biegunski |
| 5,972,537 | A | 10/1999 | Mao |
| 6,099,990 | A | 8/2000 | Denton |
| 6,232,264 | B1 | 5/2001 | Lukehart |
| 6,486,008 | B1 | 11/2002 | Lee |
| 6,733,827 | B2 | 5/2004 | Mitchell et al. |
| 6,764,617 | B1 | 7/2004 | Viswanathan |
| 7,119,179 | B1 | 10/2006 | Huynh et al. |
| 7,220,484 | B2 | 5/2007 | Ton-That |
| 7,297,652 | B2 | 11/2007 | Jhung |
| 7,303,679 | B2 | 12/2007 | Ulicny |
| 7,358,325 | B2 | 4/2008 | Hayes |
| 7,758,756 | B2 | 7/2010 | Kim |
| 8,167,973 | B2* | 5/2012 | Viswanathan ............ 75/345 |
| 2002/0064495 | A1 | 5/2002 | Miura et al. |
| 2004/0147397 | A1 | 7/2004 | Miller et al. |
| 2005/0139550 | A1 | 6/2005 | Ulicny |
| 2005/0181941 | A1 | 8/2005 | Sugo et al. |
| 2005/0186344 | A1 | 8/2005 | Takagi |
| 2005/0271816 | A1 | 12/2005 | Meschke |
| 2007/0129233 | A1 | 6/2007 | Ueno et al. |
| 2007/0142225 | A1 | 6/2007 | Baker |
| 2007/0218564 | A1 | 9/2007 | Bachmann et al. |
| 2007/0243337 | A1 | 10/2007 | Xiong |
| 2007/0264574 | A1 | 11/2007 | Kim |
| 2007/0266825 | A1 | 11/2007 | Ripley |
| 2008/0017291 | A1 | 1/2008 | Shin et al. |
| 2008/0160306 | A1 | 7/2008 | Mushtaq et al. |
| 2009/0038858 | A1 | 2/2009 | Griffo et al. |
| 2010/0015030 | A1 | 1/2010 | Mamakhel et al. |
| 2010/0200501 | A1 | 8/2010 | Hoag |
| 2010/0283005 | A1 | 11/2010 | Pickett et al. |
| 2011/0253546 | A1* | 10/2011 | Li et al. .................. 205/109 |
| 2011/0256401 | A1* | 10/2011 | Goodell et al. ............ 428/401 |

FOREIGN PATENT DOCUMENTS

| | | |
|---|---|---|
| CN | 101402057 A | 4/2009 |
| WO | 0123501 A1 | 4/2001 |
| WO | 2008127757 A2 | 10/2008 |

OTHER PUBLICATIONS

Bao et al., A novel nanostructure of nickel nanotubes encapsulated in carbon nanotubes, Chemical Communications, Cambridge, United Kingdom, 2003, (2), 208-209.

Bender et al., Total Phosphorous in Residual Materials, In Methods of Phosphorus Analysis for Soils, Sediments, Residuals, and Waters, Pierzynski, G.M., Ed. Southern Cooperative Series Bulletin No. 396. 2000.

Chen et al., Microwave-assisted synthesis of carbon supported Pt Nanoparticles for fuel cell applications, Chemical Communications, Cambridge, United Kingdom, 2002, (21), 2588-2589.

Compere et al., Low cost carbon fiber from renewable resources, Oak Ridge National Laboratory, Oak Ridge TN, USA, International Sampe Technical Conference, 2001, 33, 1306-1314, Society for the Advancement of Material and Process Engineering.

Hu et al., Microwave-assisted synthesis of a superparamagnetic surface-functionalized porous Fe3O4/C nanocomposite, Chemistry—An Asia Journal, 2006, 1(4), 605-610.

Kang et al., Obtaining carbon nanotubes from grass, Nanotechnology, 2005, 16(8), 1192-1195.

Kubo et al., Carbon fibers from Lignin-recyclable plastic blends, Encyclopedia of Chemical Processing, vol. 1, 2003, Sunggyu Lee, CRC Press pp. 317-332.

Lagashetty et al., Microwave-assisted route for synthesis of nanosized metal oxides, Science and Technology of Advanced Materials, 2007, 8(6), 484-493.

Liu, Shuling; Liu, Xinzheng; Xu, Liqiang; Qian, Yitai; Ma, Xicheng. Controlled synthesis and characterization of nickel phosphide nanocrystal. Journal of Crystal Growth (2007), 304(2), 430-434.

Marina Sofos et al., A synergistic assembly of nanoscale lamellar photoconductor hybrids, Nature Materials, 2009, 68-75, vol. 8, Nature Publishing Group.

Mayo JT, Yavuz C, Yean S, Cong L, Shipley H, Yu W, Falkner J, Kan A, Tomson M, Colvin VL, The effect of nanocrystalline magnetite size on arsenic removal, Science and Technology of Advanced Materials (2007), 8(1-2), 71-75.

Meng Qinghan et al., Copper-doped mesoporous activated carbons as electrode material for electrochemical capacitors, Journal of Applied Electrochemistry, 2006, 36(1), 63-67.

Osswald et al., Control of sp2/sp3 Carbon Ratio and Surface Chemistry of Nanodiamond Powders by Selective Oxidation in Air, J. Am. Chem. Soc., 2006, 128(35), pp. 11635-11642.

Oyama, Novel catalysts for advanced hydroprocessing: transition metal phosphides, Journal of Catalysis, 2003, 216 (1-2), 343-352.

Oyama, S. T.; Wang, X.; Requejo, F. G.; Sato, T.; Yoshimura, Y. Hydrodesulfurization of Petroleum Feedstocks with a New Type of Nonsulfide Hydrotreating Catalyst. Journal of Catalysis (2002), 209(1), 1-5.

Oyama, S. Ted; Lee, Yong-Kul. Mechanism of Hydrodenitrogenation on Phosphides and Sulfides. Journal of Physical Chemistry B (2005), 109(6), 2109-2119.

Rao et al., Synthesis of Inorganic Solids Using Microwaves, Chemistry of Materials, 1999, 11(4), 882-895.

Shipley HJ, Yean S, Kan AT, Tomson MB, Adsorption of arsenic to magnetite nanoparticles: effect of particle concentration, pH, ionic strength, and temperature, Environmental Toxicology and Chemistry (2009), 28(3), 509-515.

Vaclavikova M, Gallios GP, Hredzak S, Jakabsky S, Removal of arsenic from water streams: an overview of available techniques, Clean Technologies and Environmental Policy (2008), 10(1), 89-95.

Vivas, N.; Bourqeois, G.; Vitry, C.; Glories, Y.; de Freitas, V., "Determination of the composition of commercial tannin extracts by liquid secondary ion mass spectrometry" J. Sci. Food Agric., 1996, 72, 309-317.

Walkiewicz et al., Microwave heating characteristics of selected minerals and compounds, Minerals & Metallurgical Processing, 1988, 5(1), 39-42.

Wang, Xinjun; Han, Kun; Gao, Youjun; Wan, Fuquan; Jiang, Kai. Fabrication of novel copper phosphide (Cu3P) hollow spheres by a simple solvothermal method. Journal of Crystal Growth (2007), 307(1), 126-130.

Wei Liu et al., A Novel Carbothermal Method for the Preparation of Nano-sized WC on High Surface Area Carbon, Chemistry Letters, 2006, 1148-1149, vol. 35, No. 10, The Chemical Society of Japan, Tsukuba, Japan.

Xie, Songhai; Qiao, Minghua; Zhou, Wuzong; Luo, Ge; He, Heyong; Fan, Kangnian; Zhao, Tiejun; Yuan, Weikang Controlled synthesis, characterization, and crystallization of Ni—P nanospheres. Journal of Physical Chemistry B (2005), 109(51), 24361-24368.

Xu et al., Preparation and characterization of NiO nanorods by thermal decomposition of NiC2O4 precursor, Journal of Materials Science, 2003, 38(4), 779-782.

Yu et al., Microwaved-assisted synthesis and in-situ self-assembly of coaxial Ag/C nanotubes, Chemical Communications, Cambridge, United Kingdom, 2005, 21, 2704-2706.

Zhang et al., Microwave synthesis of nanocarbons from conducting polymers, Chemical Communications, Cambridge, United Kingdom, 2006, (23), 2477-2479.

Zhu et al., Enhanced field emission from O2 and CF4 plasma-treated CuO nanowires, Chemical Physics Letters, 2006, 419(4-6), 458-463.

\* cited by examiner

MICROWAVE-ASSISTED SYNTHESIS OF CARBON NANOTUBES FROM TANNIN, LIGNIN, AND DERIVATIVES

CROSS-REFERENCE TO RELATED PATENT APPLICATION

This application claims the benefit, pursuant to 35 U.S.C. §119(e), of U.S. provisional patent application Ser. No. 61/316,682, filed Mar. 23, 2010, entitled "MICROWAVE-ASSISTED SYNTHESIS OF CARBON NANOTUBES FROM TANNIN, LIGNIN, AND DERIVATIVES," by Tito Viswanathan, which is incorporated herein by reference in its entirety.

This application is also a continuation-in-part of U.S. patent application Ser. No. 12/487,323, filed on Jun. 18, 2009, entitled "MICROWAVE-ASSISTED SYNTHESIS OF CARBON AND CARBON-METAL COMPOSITES FROM LIGNIN, TANNIN AND ASPHALT DERIVATIVES AND APPLICATIONS OF SAME" by Tito Viswanathan, which is incorporated herein by reference in its entirety and itself claims the benefit, pursuant to 35 U.S.C. §119(e), of U.S. provisional patent application Ser. No. 61/132,380, filed Jun. 18, 2008, entitled "MICROWAVE-ASSISTED SYNTHESIS OF CARBON AND CARBON-METAL COMPOSITES FROM LINGIN, TANNIN AND ASPHALT DERIVATIVES," by Tito Viswanathan, which is incorporated herein by reference in its entirety.

This application is related to the copending U.S. patent application, which is filed concurrently with this application on Mar. 22, 2011, entitled "MICROWAVE-ASSISTED SYNTHESIS OF NANODIAMONDS FROM TANNIN, LIGNIN, ASPHALT AND DERIVATIVES," by Tito Viswanathan, which is incorporated herein by reference in its entirety, and itself claims the benefit, pursuant to 35 U.S.C. §119(e), of U.S. provisional patent application Ser. No. 61/316,654, filed Mar. 23, 2010, entitled "MICROWAVE-ASSISTED SYNTHESIS OF NANODIAMONDS FROM TANNIN, LIGNIN, ASPHALT AND DERIVATIVES," by Tito Viswanathan, which is incorporated herein by reference in its entirety.

Some references, which may include patents, patent applications and various publications, are cited in a reference list and discussed in the description of this invention. The citation and/or discussion of such references is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

STATEMENT OF FEDERALLY-SPONSORED RESEARCH

The present invention was made with government support under Grant No. DE-FC 36-06 GO 86072 awarded by U.S. Department of Energy (DOE). The government has certain rights in the invention.

FIELD OF THE INVENTION

The present invention relates generally to synthesis of carbon nanotubes, and more particularly to microwave-assisted synthesis of carbon nanotubes.

BACKGROUND

Carbon nanostructures in the form of carbon black, graphite, fullerene, single walled, double walled, multi-walled carbon nanotubes as well as nanodiamonds play a significant role in present and future technology. The applications of these nanostructures range from reinforcement in rubber tires, electrodes in batteries and fuel cells, electrostatic dissipation, electromagnetic interference shielding, and photovoltaic cells, to radar-evading stealth coatings. Specific exemplary applications of carbon nanotubes are their use in nanocomposites and in faster and more efficient electronic devices. Other potential applications include biocomposites and delivery of drugs. They may also serve as semi-transparent optical material. The high surface area of nanotubes also renders them useful as a catalyst support material. They could also be used in field effect transistors.

Thus, nanotube form of carbon is poised to become one of the most important carbon forms in terms of use and applications. The synthesis carbon nanotubes, however, involves substantial investment in terms of safety, cost, time, and apparatus, besides requiring expertise in instrument operation. For example, one of the synthetic techniques involves chemical vapor deposition (CVD) on selected catalysts placed on special supports. The reaction takes place in a reducing or inert atmosphere and requires significant investment in time, energy, expertise and cost. The technique is also not easily scalable.

Therefore, a heretofore unaddressed need exists in the art to address the aforementioned deficiencies and inadequacies.

SUMMARY OF THE INVENTION

In one aspect, the present invention provides a method of synthesizing carbon nanotubes, comprising the steps of:

dissolving a first amount of a first transition-metal salt and a second amount of a second transition-metal salt in water to form a solution;

adding a third amount of tannin to the solution to form a mixture;

heating the mixture to a first temperature for a first duration of time to form a sample; and subjecting the sample to a microwave radiation for a second duration of time effective to produce a plurality of carbon nanotubes.

In one embodiment, the first transition metal salt is iron chloride ($FeCl_3$), and the second transition metal salt is nickel chloride ($NiCl_2$).

In one embodiment, the molar ratio of $FeCl_3$ and $NiCl_2$ is about 3:1.

In one embodiment, the first temperature is about 250° C. or about 300° C., respectively.

In one embodiment, the heating step comprises the step of heating the mixture in a furnace with or without air flow to dry the sample, respectively.

In one embodiment, prior to the subjecting step, further comprising the steps of:

placing the sample in a first container; and placing the first container with the sample in a second container that contains graphite or carbon black.

In one embodiment, the step of subjecting comprises the step of subjecting the dry sample placed in the first container to the microwave radiation, wherein the first container is placed in the second container, which is positioned such that at least part of the graphite or carbon black contained in the second container is also subjected to the microwave radiation.

In another embodiment, the frequency of the microwave radiation is about 2.45 GHz.

In yet another embodiment, the tannin is Quebracho tannin.

In a further embodiment, the tannin is unmodified and hot water-soluble.

In another aspect, the present invention provides an article of manufacture made by the method set forth immediately above.

In yet another aspect, the present invention provides a method of synthesizing carbon nanotubes, comprising the steps of:

dissolving a first amount of a first transition-metal salt and a second amount of a second transition-metal salt in water to form a solution;

adding a third amount of lignin to the solution to form a mixture;

heating the mixture to a first temperature for a first duration of time to form a sample; and subjecting the sample to a microwave radiation for a second duration of time effective to produce a plurality of carbon nanotubes.

In one embodiment, the first transition metal salt is iron chloride ($FeCl_3$), and the second transition metal salt is nickel chloride ($NiCl_2$).

In one embodiment, the molar ratio of $FeCl_3$ and $NiCl_2$ is about 3:1.

In one embodiment, the first temperature is about 300° C.

In one embodiment, the heating step comprises the step of heating the mixture in a furnace with air flow to dry the sample.

In one embodiment, prior to the subjecting step, further comprising the steps of:

placing the sample in a first container; and placing the first container with the sample in a second container that contains graphite or carbon black.

In another embodiment, the step of subjecting comprises the step of subjecting the dry sample placed in the first container to the microwave radiation, wherein the first container is placed in the second container, which is positioned such that at least part of the graphite or carbon black contained in the second container is also subjected to the microwave radiation.

In yet another embodiment, the frequency of the microwave radiation is about 2.45 GHz.

In a further embodiment, wherein the lignin comprises a sodium salt of lignin.

In a further aspect, the present invention provides an article of manufacture made by the method set forth immediately above.

These and other aspects of the present invention will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The drawings described below are for illustration purposes only. The drawings are not intended to limit the scope of the present teachings in any way. The patent or application file may contain at least one drawing executed in color. If so, copies of this patent or patent application publication with color drawing(s) will be provided by the Office upon request and payment of the necessary fee.

DETAILED DESCRIPTION

Figure 1:
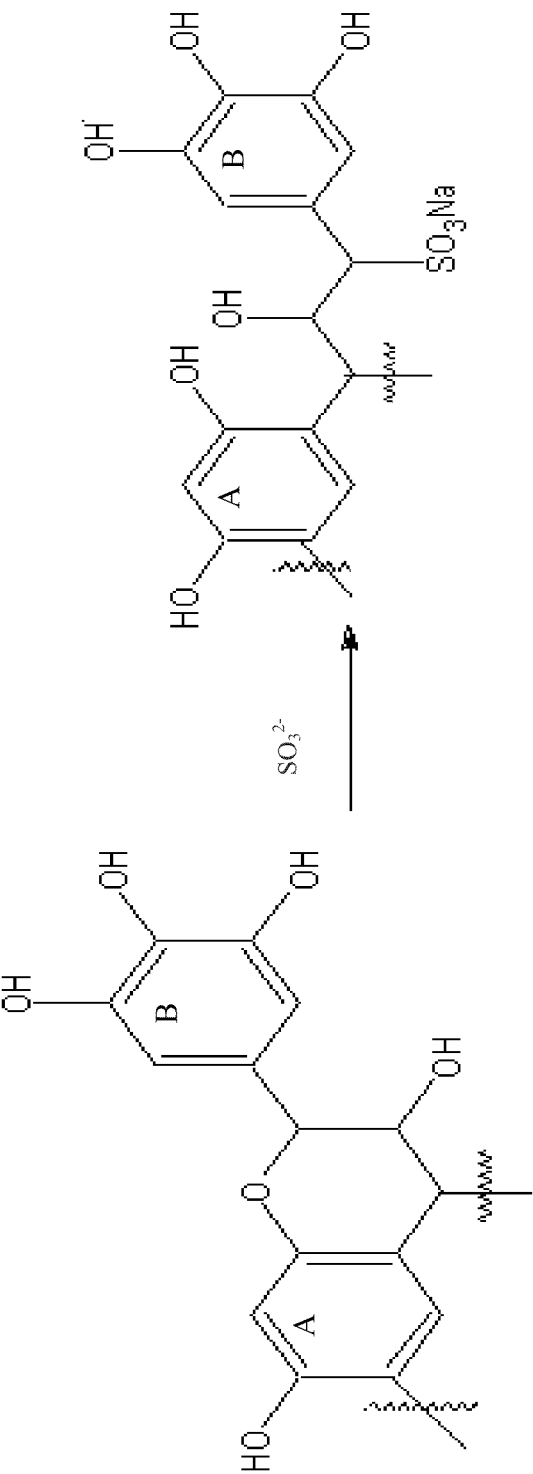
FIG. 1 shows a reaction scheme for the sulfonation of a monomeric unit of condensed tannin.

The present invention is more particularly described in the following examples that are intended as illustrative only since numerous modifications and variations therein will be apparent to those skilled in the art. Various embodiments of the invention are now described in detail. Referring to the drawings, FIGS. 1-9, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

Definitions

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "scanning electron microscope (SEM)" refers to a type of electron microscope that images the sample surface by scanning it with a high-energy beam of electrons in a raster scan pattern. The electrons interact with the atoms that make up the sample producing signals that contain information about the sample's surface topography, composition and other properties such as electrical conductivity.

As used herein, "nanoscopic-scale," "nanoscopic," "nanometer-scale," "nanoscale," "nanocomposites," "nanoparticles," the "nano-" prefix, and the like generally refers to elements or articles having widths or diameters of less than about 1 µm, preferably less than about 100 nm in some cases. In all embodiments, specified widths can be smallest width (i.e. a width as specified where, at that location, the article can have a larger width in a different dimension), or largest width (i.e. where, at that location, the article's width is no wider than as specified, but can have a length that is greater).

As used herein, "carbon nanostructures" refer to carbon fibers or carbon nanotubes that have a diameter of 1 µm or smaller which is finer than that of carbon fibers. However, there is no particularly definite boundary between carbon fibers and carbon nanotubes. By a narrow definition, the material whose carbon faces with hexagon meshes are almost parallel to the axis of the corresponding carbon tube is called a carbon nanotube, and even a variant of the carbon nanotube, around which amorphous carbon exists, is included in the carbon nanotube.

As used herein, "plurality" means two or more.

As used herein, the terms "comprising," "including," "carrying," "having," "containing," "involving," and the like are to be understood to be open-ended, i.e., to mean including but not limited to.

Overview of the Invention

The present invention provides, among other things, an innovative method of synthesizing carbon nanotubes assisted by microwave radiation, using lignins, tannins, lignosulfonates, tanninsulfonates and their metal salts as starting materials.

Carbon nanostructures in the form of carbon black, graphite, fullerene, single walled, double walled, multi-walled carbon nanotubes as well as nanodiamonds play a significant role in present and future technology. The applications of these nanostructures range from reinforcement in rubber tires, electrodes in batteries and fuel cells, electrostatic dissipation, electromagnetic interference shielding, and photovoltaic cells, to radar-evading stealth coatings. Specific exemplary applications of carbon nanotubes are their use in nanocomposites and in faster and more efficient electronic devices. Other potential applications include biocomposites and delivery of drugs. They may also serve as semi-transparent optical material. The high surface area of nanotubes also renders them useful as a catalyst support material. They could also be used in field effect transistors.

Thus, nanotube form of carbon is poised to become one of the most important carbon forms in terms of use and applications. The synthesis carbon nanotubes, however, involves substantial investment in terms of safety, cost, time, and apparatus, besides requiring expertise in instrument operation. For example, one of the synthetic techniques involves chemical vapor deposition (CVD) on selected catalysts placed on special supports. The reaction takes place in a reducing or inert atmosphere and requires significant investment in time, energy, expertise and cost. The technique is also not easily scalable.

The use of microwave for preparing nanomaterials should be considered a greener method for the synthesis of the nanostructures due to savings in terms of cost, time, and investment. This invention, as disclosed herein, among other things, enables the preparation of carbon nanostructures including carbon nanotubes using a simplified yet innovative microwave-assisted synthesis, using lignins, tannins, lignosulfonates, tanninsulfonates, and their metal salts as starting materials.

Tannin and Sources

Tannins are naturally occurring polyphenols that are found in the vascular tissue of plants such as the leaves, bark, grasses, and flowers. They are classified into two groups: condensed tannins and hydrolysable tannins FIG. 1 illustrates the reaction scheme for the sulfonation of monomeric unit of condensed tannin. The structure consists of three rings: two benzene rings on either side of an oxygen-containing heterocyclic ring. The A-ring to the left of the cyclic ether ring consists of one or two hydroxyl groups. The B-ring present on the right of the cyclic ether ring also consists of two or three hydroxyl groups.

A particular tannin of interest is Quebracho tannin. This tannin is obtained from the hot water extraction of the heartwoods of Schinopsis balansae and lorentzii, indigenous to Argentina and Paraguay. Quebracho accounts for 30% of the dry weight of the heartwoods with a production level averaging 177,000 tons per year over the past 30 years, according to the Tannin Corporation, Peabody, Mass. In addition to unmodified hot water-soluble tannins, cold water soluble sulfonated tannins are commercially available and represent an inexpensive renewable resource. For example, Chevron Philips Company in Bartlesville, Okla. supplies tannins with different degrees of sulfonation. The MSDSs and technical data sheets providing the structure and percentage of sulfur in the products are also provided. Sold under the trade name of "Orform" tannins, these represent an alternate source of a sulfonated renewable resource that could be compared to sulfonated lignins.

Lignin and Sources

Lignin, the major non-cellulosic constituent of wood, is a complex phenolic polymer that bears a superficial resemblance to phenol-formaldehyde resins. It consists of functionalized phenylpropane units connected via alkyl and aryl ether linkages. Essentially, all of the lignin commercially available is isolated as by-products from the paper industry from either the sulfite or the Kraft process.

Figure 2:
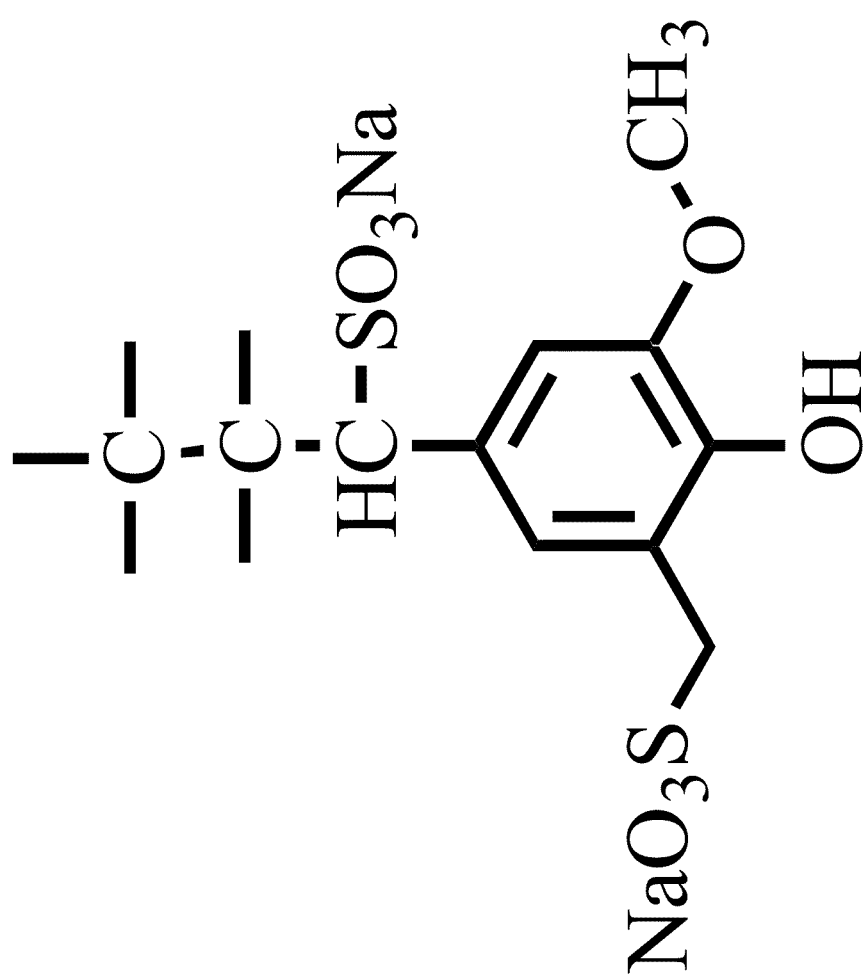
FIG. 2 shows a typical sulfonated/sulfomethylated lignin monomer unit.

Sulfonated lignins are obtained either as spent sulfite liquor (SSL) or by sulfonation of lignin obtained from the Kraft process. SSL obtained from the sulfite process consists of lignosulfonates (about 55%), sugars (30%), and other ingredients in smaller amounts. FIG. 2 shows a typical monomeric unit of Kraft lignin that has been sulfomethylated at the aromatic ring and sulfonated on the aliphatic side chain. Sulfomethylation is accomplished by the reaction of the Kraft lignin with formaldehyde and sodium sulfite. The aliphatic sulfonation occurs preferentially at the benzylic position of the side chain of the phenylpropane units. Lignosulfonates are available in the form of calcium or sodium salts (Borasperse® and Ultrazine® from Mead Westvaco, for examples) and are cheaper alternatives to other forms of lignosulfonates. Lignotech's calcium salt of lignosulfonic acid [Borresperse, Calif.] is especially suitable for the synthesis of metal-carbon nanocomposites. Some of the applications of lignosulfonates are in concrete admixtures, animal feed, oil-well drilling muds, dust control, emulsion stabilizers, dye dispersants, wood preservation, and mining aids. Almost a million metric tones of lignosulfonate are produced every year by the major manufacturers according to their annual production that is published.

Mead Westvaco and LignoTech USA are two of the major manufacturers of lignosulfonates in the U.S. and a variety of sulfonated lignin products are available from them. The sulfonation can be controlled to occur either at the aromatic ring or the benzylic position or both. The degree and position of sulfonation can affect the final property and potential application of the lignin.

Asphalt, Sulfonated Asphalt and Asphaltenes

Sulfonated asphalts are used extensively in the petroleum industry. They are produced by the sulfonation of asphalt which is derived from petroleum. Asphalts are residues obtained during the purification of petroleum. They represent a complex mixture of low and high molecular weight aromatics and alkanes. Addition of low molecular weight alkanes such as pentane, hexane or heptane results in the dissolution of most of the hydrocarbons in asphalt leaving behind a residue of high molecular weight substituted aromatics collectively called "asphaltenes". The structure of asphaltene is quite complicated but generally consists of high molecular weight polycyclic hydrocarbons with alkyl substituents. It also has a small but varying percentage of S and N in its structure. The asphaltene content in asphalt may vary from 5 to 10% or more.

Thus, in one aspect, the present invention provides a method of synthesizing carbon nanotubes, comprising the steps of:

dissolving a first amount of a first transition-metal salt and a second amount of a second transition-metal salt in water to form a solution;

adding a third amount of tannin to the solution to form a mixture;

heating the mixture to a first temperature for a first duration of time to form a sample 312; and subjecting the sample 312 to a microwave radiation for a second duration of time effective to produce a plurality of carbon nanotubes.

In one embodiment, the first transition metal salt is iron chloride ($FeCl_3$), and the second transition metal salt is nickel chloride ($NiCl_2$).

In one embodiment, the molar ratio of $FeCl_3$ and $NiCl_2$ is about 3:1.

In one embodiment, the first temperature is about 250° C. or about 300° C., respectively.

In one embodiment, the heating step comprises the step of heating the mixture in a furnace with or without air flow to dry the sample, respectively.

Figure 3:
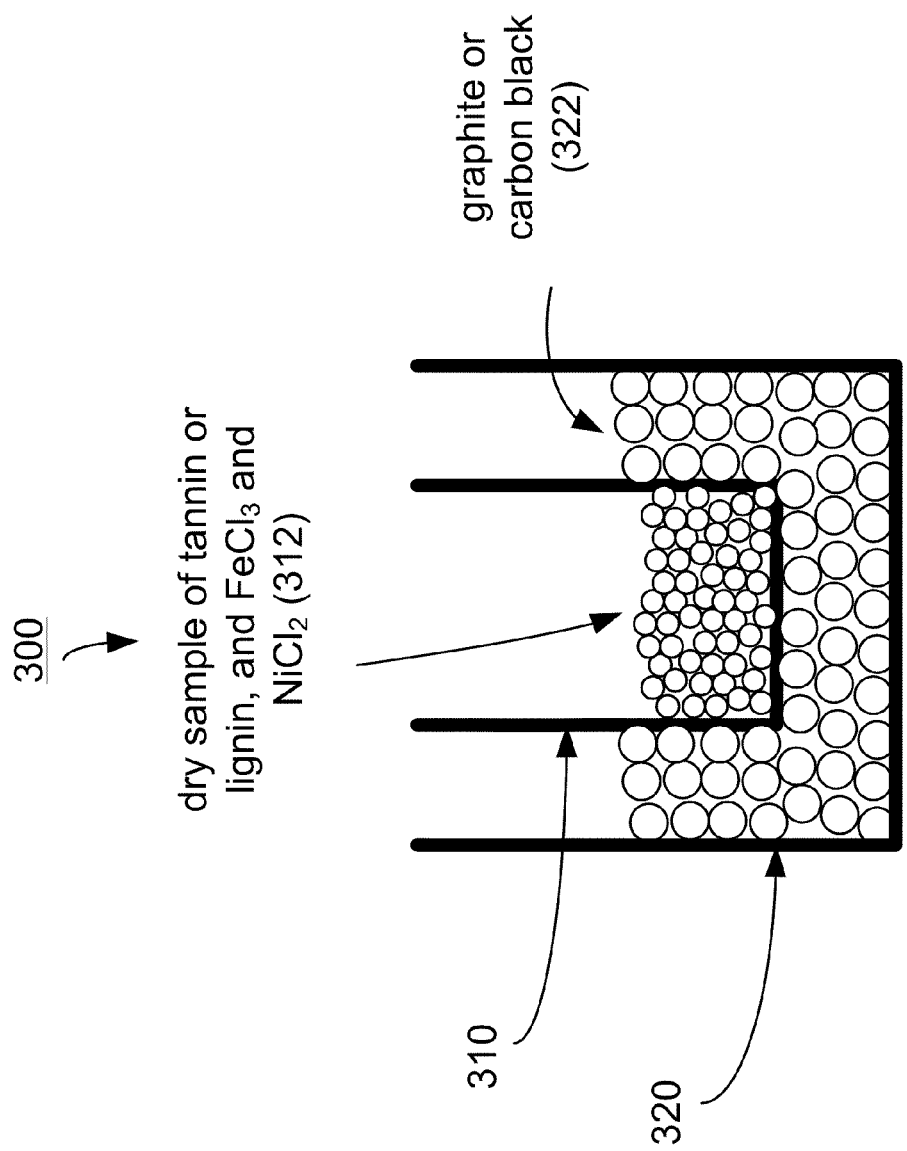
FIG. 3 shows schematically an assembly 300 in part according to some embodiments of the present invention.

In one embodiment as shown in FIG. 3, prior to the subjecting step, further comprising the steps of:

placing the sample 312 in a first container 310; and placing the first container 310 with the sample 312 in a second container 320 that contains graphite or carbon black 322.

In one embodiment, the step of subjecting comprises the step of subjecting the dry sample 312 placed in the first container 310 to the microwave radiation, wherein the first container 310 is placed in the second container 320, which is positioned such that at least part of the graphite or carbon black 322 contained in the second container 320 is also subjected to the microwave radiation.

In another embodiment, the frequency of the microwave radiation is about 2.45 GHz.

In yet another embodiment, the tannin is Quebracho tannin.

In a further embodiment, the tannin is unmodified and hot water-soluble.

In another aspect, the present invention provides an article of manufacture made by the method set forth immediately above.

In yet another aspect, the present invention provides a method of synthesizing carbon nanotubes, comprising the steps of:

dissolving a first amount of a first transition-metal salt and a second amount of a second transition-metal salt in water to form a solution;

adding a third amount of lignin to the solution to form a mixture;

heating the mixture to a first temperature for a first duration of time to form a sample 312; and subjecting the sample 312 to a microwave radiation for a second duration of time effective to produce a plurality of carbon nanotubes.

In one embodiment, the first transition metal salt is iron chloride ($FeCl_3$), and the second transition metal salt is nickel chloride ($NiCl_2$).

In one embodiment, the molar ratio of $FeCl_3$ and $NiCl_2$ is about 3:1.

In one embodiment, the first temperature is about 300° C.

In one embodiment, the heating step comprises the step of heating the mixture in a furnace with air flow to dry the sample.

In one embodiment as shown in FIG. 3, prior to the subjecting step, further comprising the steps of:

placing the sample 312 in a first container 310; and placing the first container 310 with the sample 312 in a second container 320 that contains graphite or carbon black 322.

In another embodiment, the step of subjecting comprises the step of subjecting the dry sample 312 placed in the first container 310 to the microwave radiation, wherein the first container 310 is placed in the second container 320, which is positioned such that at least part of the graphite or carbon black 322 contained in the second container 320 is also subjected to the microwave radiation.

In yet another embodiment, the frequency of the microwave radiation is about 2.45 GHz.

In a further embodiment, wherein the lignin comprises a sodium salt of lignin.

In a further aspect, the present invention provides an article of manufacture made by the method set forth immediately above.

Additional details are set forth below.

EXAMPLES

Aspects of the present teachings may be further understood in light of the following examples, which should not be construed as limiting the scope of the present teachings in any way.

Example 1

A mixture of 0.145 g of $FeCl_3.6H_2O$ and 0.041 g of $NiCl_2.6H_2O$ (molar ratio of Fe:Ni::3:1) was dissolved in in about 3.5 mL of water in a mortar. A yellow colored clear liquid was obtained. Then a 1 g sample of tannin (hot water soluble, Quebracho, unmodified) was added to the clear solution. The mixture was ground thoroughly using a pestle. The wet sample in the mortar was placed inside a furnace at about 250° C. for a period of 7 minutes. The dry sample was cooled and powdered. The powdered sample 312 was subjected to microwave in a suitable container 310 placed in another container 320 containing dry graphite or carbon black powder 322, as shown schematically in FIG. 3. The graphite or carbon black powder 322 assisted in the heating of the tannin powder 312. The microwave frequency used was a domestic microwave oven operating at 2.45 GHz with 900 W power, in which the entire assembly 300 was placed. The outer carbon sample got red hot within ten seconds after turning on the microwave oven and the tannin in the reaction vessel started to liberate smoke within a minute. The reaction was carried out for a total of 4 minutes during which the smoke from the sample had subsided. (The black sample was powdered and optionally washed with water and then dried). Yield was 0.5 grams.

Example 2

In another embodiment, a mixture of 0.145 g of $FeCl_3.6H_2O$ (0.03 g Fe) and 0.041 g of $NiCl_2.6H_2O$ (0.01 g of Ni) (approximate molar ratio of Fe:Ni::3:1) was dissolved in about 2.5 mL of water in a mortar. A yellow colored clear liquid was obtained. Then a 1 g sample of tannin (hot water soluble, Quebracho, unmodified) was added to the clear solution. The mixture was ground thoroughly using a pestle. The wet sample in the mortar was placed inside a furnace at about 300° C. for a period of 5 minutes with airflow. The dry sample was cooled and powdered. The powdered sample 312 was subjected to microwave in a suitable container 310 placed in another container 320 containing dry graphite or carbon black powder 322, as shown schematically in FIG. 3. The graphite or carbon black powder 322 assisted in the heating of the tannin powder 312. The microwave frequency used was a domestic microwave oven operating at 2.45 GHz with 900 W power, in which the entire assembly 300 was placed. The outer carbon sample got red hot within ten seconds after turning on the microwave oven and the tannin in the reaction vessel started to liberate smoke within a minute. The reaction was carried out for a total of four and a half minutes during which the smoke from the sample had subsided. A black powder was obtained and a pink deposit was seen on the upper part of the reaction vessel. (The black sample was (easily) powdered and optionally washed with water and then dried). Yield was 0.51 g.

Example 3

In yet another embodiment, a mixture of 0.145 g of $FeCl_3.6H_2O$ (0.03 g Fe) and 0.041 g of $NiCl_2.6H_2O$ (0.01 g of Ni) (approximate molar ratio of Fe:Ni::3:1) was dissolved in about 2.0 mL of water in a mortar. A yellow colored clear liquid was obtained. Then a 1 g sample of lignin (Indulin C, Mead Westvaco) was added to the clear solution. The mixture was ground thoroughly using a pestle. The wet sample in the mortar was placed inside a furnace at about 300° C. for a period of 10 minutes with airflow. The dry sample was cooled and powdered. The powdered sample 312 was subjected to microwave in a suitable container 310 placed in another container 320 containing dry graphite or carbon black powder 322, as shown schematically in FIG. 3. The graphite or carbon black powder 322 assisted in the heating of the lignin powder 312. The microwave frequency used was a domestic microwave oven operating at 2.45 GHz with 900 W power, in which the entire assembly 300 was placed. The outer carbon sample got red hot within ten seconds after turning on the microwave oven and the lignin in the reaction vessel started to liberate smoke within a minute. The reaction was carried out for a total of five and a half minutes during which the smoke from the sample had subsided. A black powder was obtained and a pink deposit was seen on the upper part of the reaction vessel. (The black sample was (easily) powdered and optionally washed with water and then dried). Yield was 0.57 g.

Example 4

This example describes carbon nanotubes that are synthesized according to one embodiment of the present invention utilizing the exemplary processes set forth in Example 1, or a process similar to it.

Figure 4:
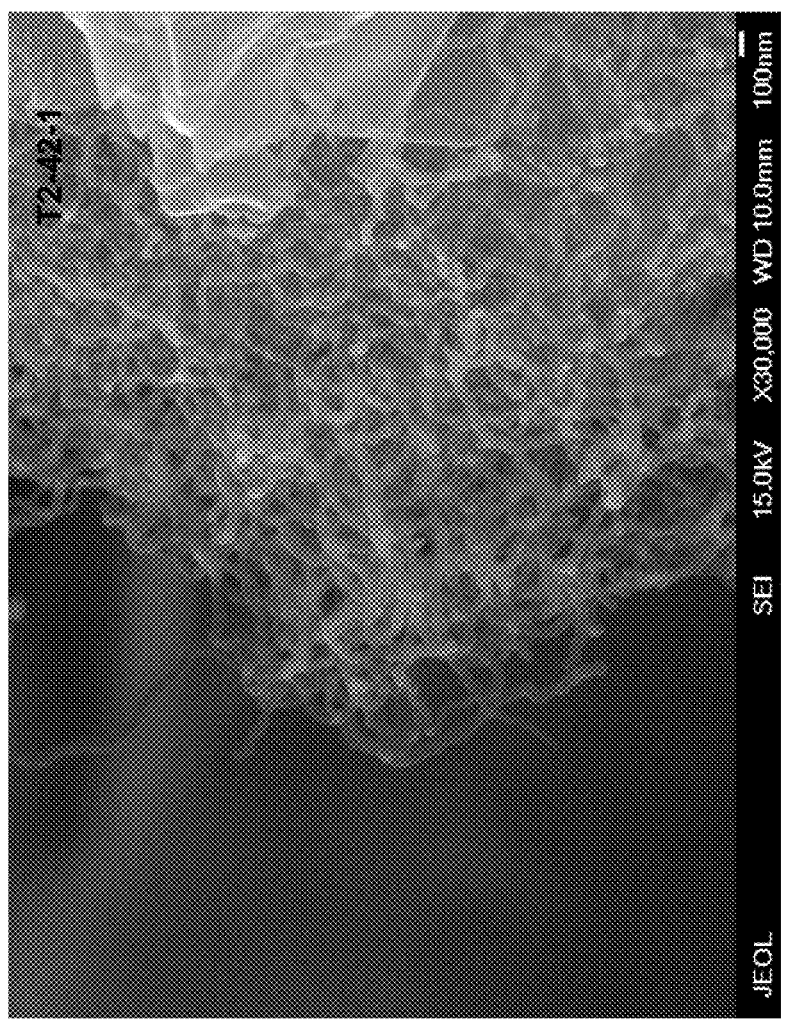
FIG. 4 shows an SEM image of carbon nanotubes synthesized from tannin according to one embodiments of the present invention.

FIG. 4 shows an SEM image of carbon nanotubes synthesized from tannin according to one embodiment of the present invention.

Figure 5:
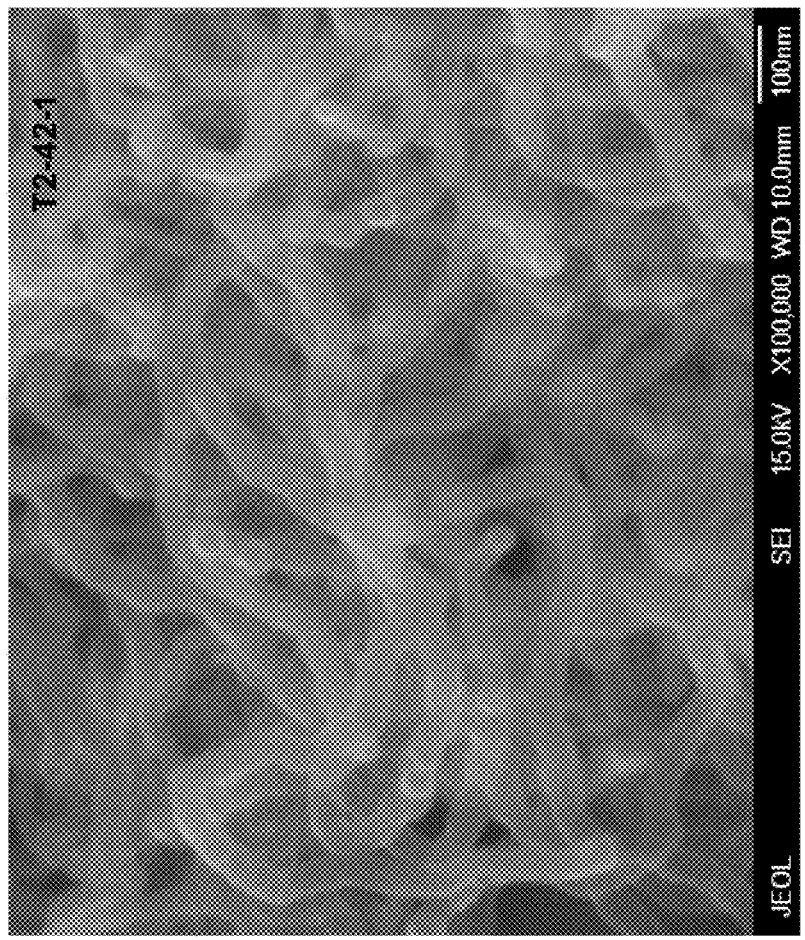
FIG. 5 shows an SEM image of carbon nanotubes synthesized from tannin according to one embodiment of the present invention.

FIG. 5 shows an SEM image of carbon nanotubes synthesized from tannin according to one embodiment of the present invention.

Example 5

This example describes carbon nanotubes that are synthesized according to one embodiment of the present invention utilizing the exemplary processes set forth in Example 2, or a process similar to it.

Figure 6:
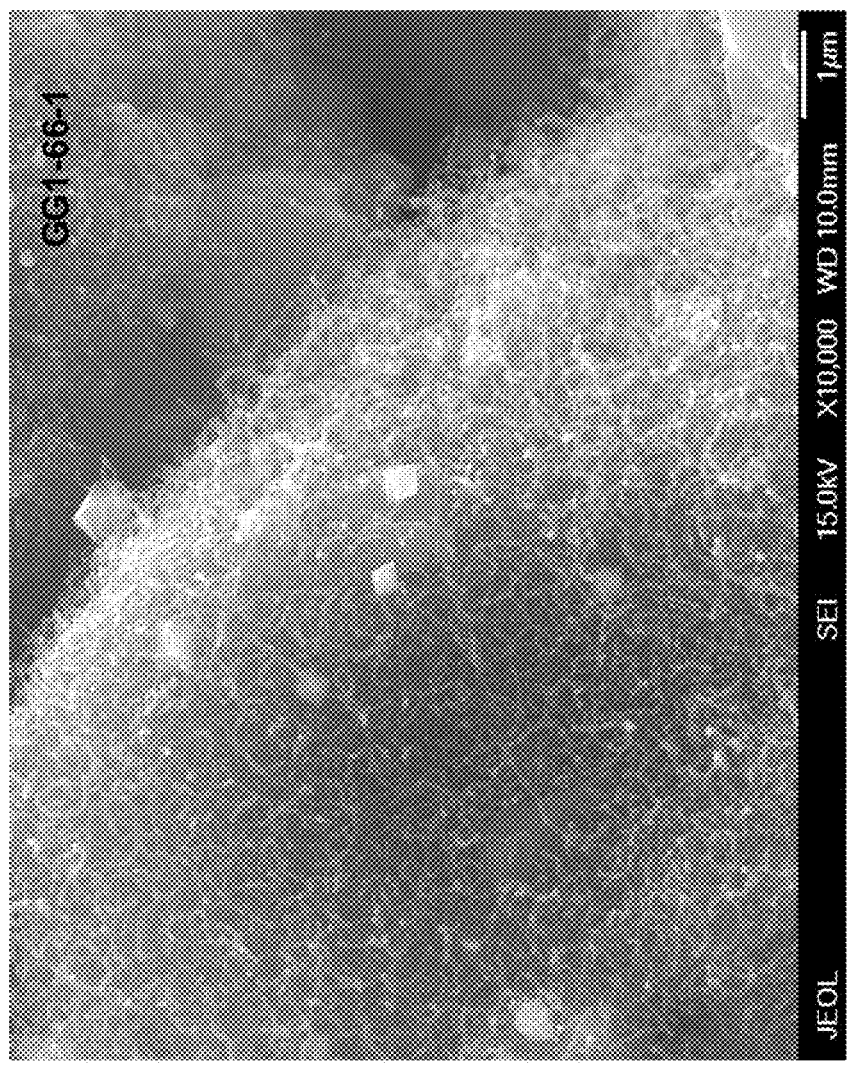
FIG. 6 shows an SEM image of carbon nanotubes synthesized from tannin according to one embodiment of the present invention.

FIG. 6 shows an SEM image of carbon nanotubes synthesized from tannin according to one embodiment of the present invention.

Figure 7:
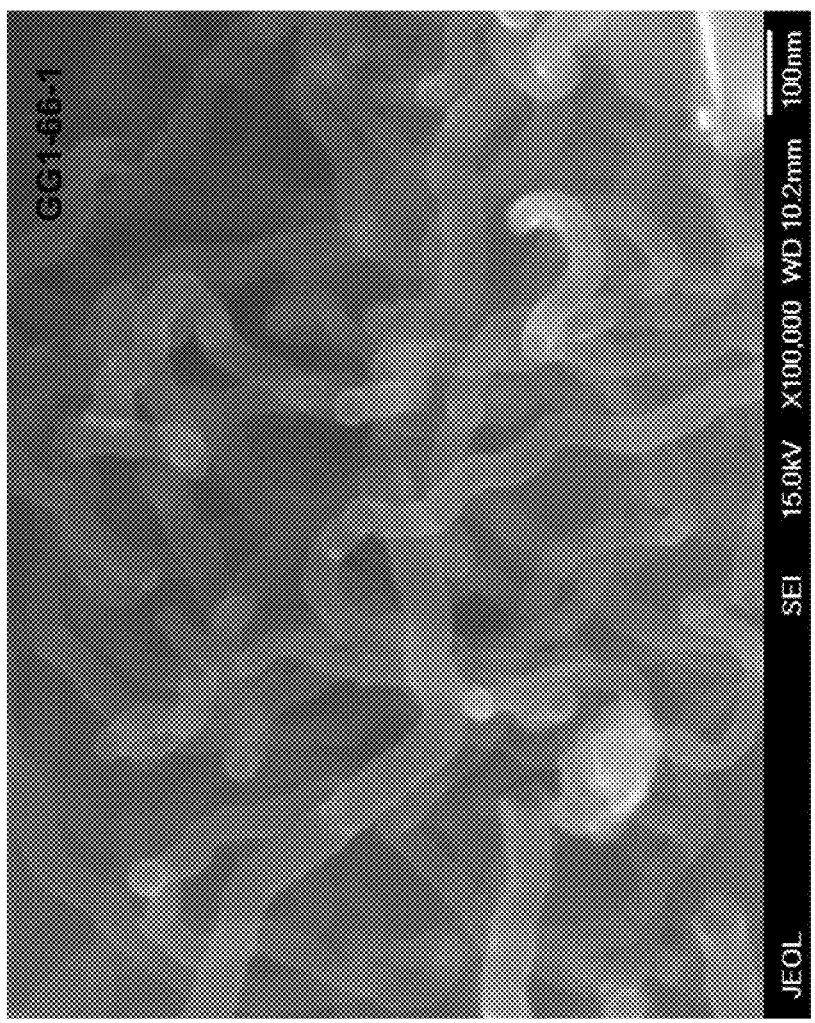
FIG. 7 shows an SEM image of carbon nanotubes synthesized from tannin according to one embodiment of the present invention.

FIG. 7 shows an SEM image of carbon nanotubes synthesized from tannin according to one embodiment of the present invention.

Example 6

This example describes carbon nanotubes that are synthesized according to one embodiment of the present invention utilizing the exemplary processes set forth in Example 3, or a process similar to it.

Figure 8:
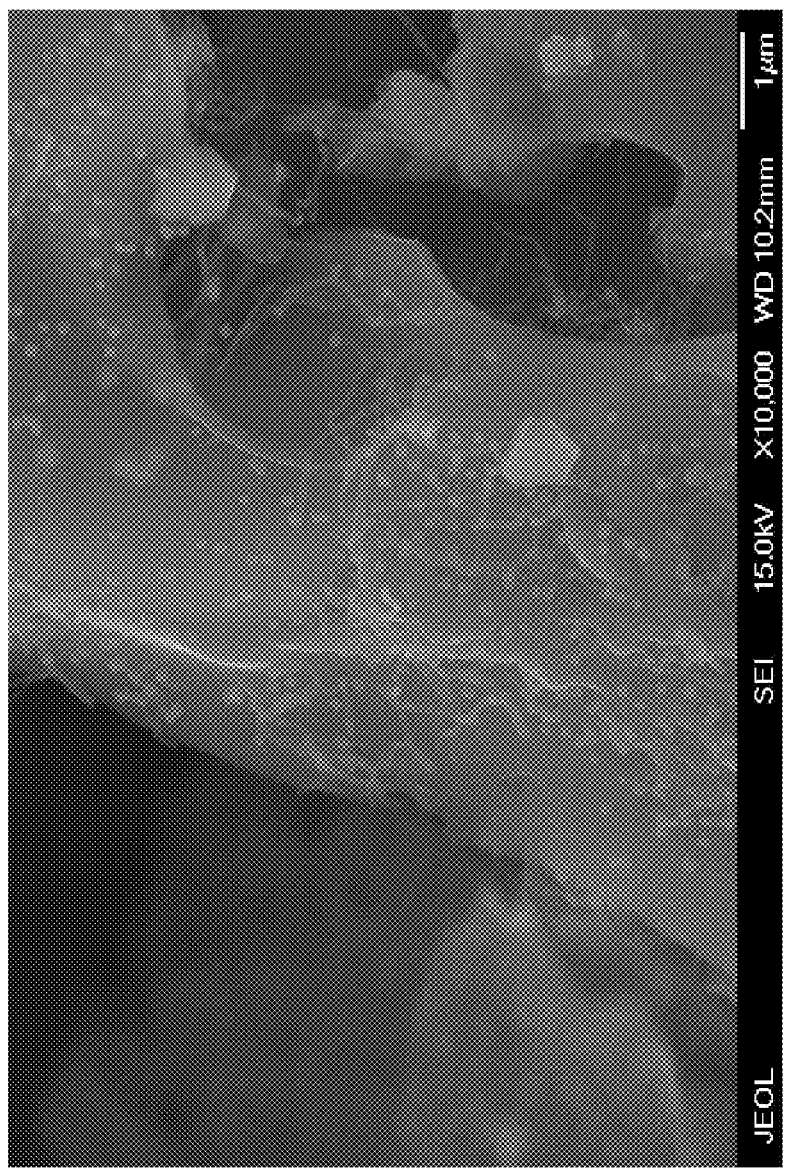
FIG. 8 shows an SEM image of carbon nanotubes synthesized from lignin according to one embodiment of the present invention.

FIG. 8 shows an SEM image of carbon nanotubes synthesized from lignin according one embodiment of the present invention.

Figure 9:
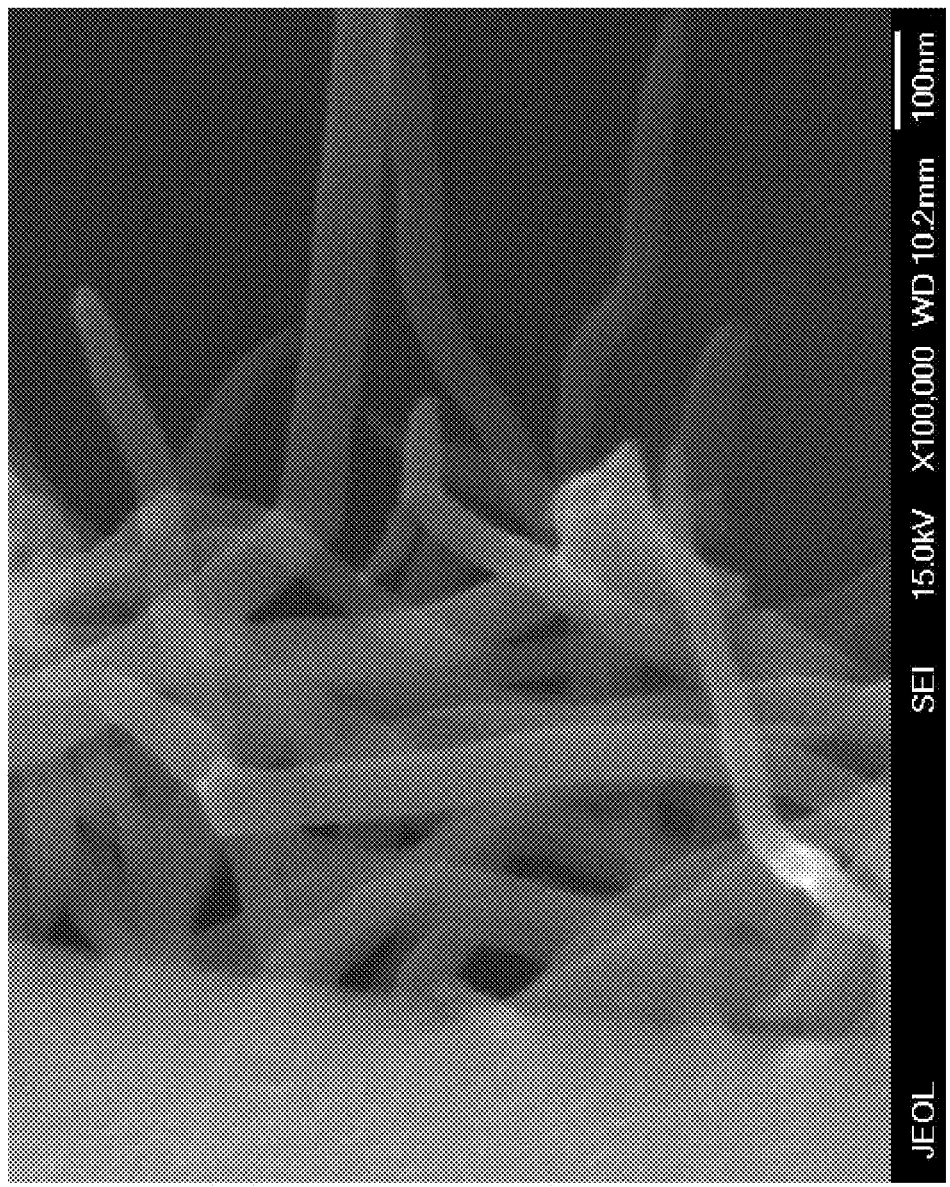
FIG. 9 shows an SEM image of carbon nanotubes synthesized from lignin according to one embodiment of the present invention.

FIG. 9 shows an SEM image of carbon nanotubes synthesized from lignin according to one embodiment of the present invention.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method of synthesizing carbon nanotubes, comprising the steps of:
   (a) dissolving a first amount of a first transition-metal salt and a second amount of a second transition-metal salt in water to form a solution;
   (b) adding an amount of tannin to the solution to form a mixture;
   (c) heating the mixture to a first temperature for a first duration of time to form a sample; and
   (d) subjecting the sample to a microwave radiation for a second duration of time effective to produce a plurality of carbon nanotubes.

2. The method of claim 1, wherein the first transition metal salt is iron chloride ($FeCl_3$), and the second transition metal salt is nickel chloride ($NiCl_2$).

3. The method of claim 2, wherein the molar ratio of the $FeCl_3$ and the $NiCl_2$ is about 3:1.

4. The method of claim 1, wherein the first temperature is about 250° C. or about 300° C., respectively.

5. The method of claim 4, wherein the heating step comprises the step of heating the mixture in a furnace with or without air flow to dry the sample, respectively.

6. The method of claim 1, prior to the subjecting step, further comprising the steps of:
   (c1) placing the sample in a first container; and
   (c2) placing the first container with the sample in a second container that contains graphite or carbon black.

7. The method of claim 6, wherein the step of subjecting comprises the step of subjecting the dry sample placed in the first container to the microwave radiation, wherein the first container is placed in the second container, which is positioned such that at least part of the graphite or carbon black contained in the second container is also subjected to the microwave radiation.

8. The method of claim 1, wherein the frequency of the microwave radiation is about 2.45 GHz.

9. The method of claim 1, wherein the tannin is Quebracho tannin.

10. The method of claim 9, wherein the tannin is unmodified and hot water-soluble.

11. A method of synthesizing carbon nanotubes, comprising the steps of:
   (a) dissolving a first amount of a first transition-metal salt and a second amount of a second transition-metal salt in water to form a solution;
   (b) adding an amount of lignin to the solution to form a mixture;
   (c) heating the mixture to a first temperature for a first duration of time to form a sample; and
   (d) subjecting the sample to a microwave radiation for a second duration of time effective to produce a plurality of carbon nanotubes.

12. The method of claim 11, wherein the first transition metal salt is iron chloride ($FeCl_3$), and the second transition metal salt is nickel chloride ($NiCl_2$).

13. The method of claim 12, wherein the molar ratio of the $FeCl_3$ and the $NiCl_2$ is about 3:1.

14. The method of claim 11, wherein the first temperature is about 300° C.

15. The method of claim 14, wherein the heating step comprises the step of heating the mixture in a furnace with air flow to dry the sample.

16. The method of claim 11, prior to the subjecting step, further comprising the steps of:
   (c1) placing the sample in a first container; and
   (c2) placing the first container with the sample in a second container that contains graphite or carbon black.

17. The method of claim 16, wherein the step of subjecting comprises the step of subjecting the dry sample placed in the first container to the microwave radiation, wherein the first container is placed in the second container, which is positioned such that at least part of the graphite or carbon black contained in the second container is also subjected to the microwave radiation.

18. The method of claim 11, wherein the frequency of the microwave radiation is about 2.45 GHz.

19. The method of claim 11, wherein the lignin comprises a sodium salt of lignin.

* * * * *